US009020366B2

(12) United States Patent
Okamoto

(10) Patent No.: US 9,020,366 B2
(45) Date of Patent: Apr. 28, 2015

(54) POLARIZATION MULTIPLEXING OPTICAL RECEIVING DEVICE AND POLARIZATION MULTIPLEXING OPTICAL RECEIVING METHOD

(75) Inventor: Takeshi Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

(21) Appl. No.: 13/977,937

(22) PCT Filed: Jan. 20, 2012

(86) PCT No.: PCT/JP2012/051728
§ 371 (c)(1),
(2), (4) Date: Jul. 2, 2013

(87) PCT Pub. No.: WO2012/102358
PCT Pub. Date: Aug. 2, 2012

(65) Prior Publication Data
US 2013/0294765 A1 Nov. 7, 2013

(30) Foreign Application Priority Data
Jan. 24, 2011 (JP) .................. 2011-011888

(51) Int. Cl.
H04B 10/06 (2006.01)
H04B 10/60 (2013.01)
(Continued)

(52) U.S. Cl.
CPC ............. *H04B 10/60* (2013.01); *G02B 27/283* (2013.01); *G02F 1/015* (2013.01); *H04B 10/671* (2013.01); *H04J 14/0221* (2013.01); *H04J 14/06* (2013.01)

(58) Field of Classification Search
CPC .... G02B 27/283; H04B 10/60; H04B 10/671; H04J 14/0221; H04J 14/06
USPC ......... 398/205, 206, 210, 209, 186, 184, 152, 398/65, 25, 208, 37
See application file for complete search history.

(56) References Cited

U.S. PATENT DOCUMENTS 5,526,176 A * 6/1996 Furukawa ...................... 359/344
5,606,633 A * 2/1997 Groger et al. .................. 385/12
(Continued)

FOREIGN PATENT DOCUMENTS

JP 62-049337 A 3/1987
JP 62049337 * 4/1987 ............... H04B 9/00
(Continued)

OTHER PUBLICATIONS

Songnian Fu, et al., "Nonlinear Polarization Rotation in Semiconductor Optical Amplifiers With Linear Polarization Maintenance", IEEE Photonics Technology Letters, IEEE, Dec. 1, 2007, pp. 1931-1933, vol. 19, No. 23.
(Continued)

Primary Examiner — Dalzid Singh
Assistant Examiner — Hibret Woldekidan
(74) Attorney, Agent, or Firm — Sughrue Mion, PLLC

(57) ABSTRACT

Provided are a polarization multiplexing optical receiving device and a polarization multiplexing optical receiving method with which a mismatch of optical intensity between polarized signals accumulated in an optical transmission path of an optical receiving system can be compensated with high precision, and a high-quality polarized optical signal can be received.
A polarization multiplexing optical receiving device according to the present invention includes: a semiconductor optical element for adjusting the optical signal intensity of each of a TE mode and a TM mode of a polarization-multiplexed optical signal; a polarization beam splitter for spectrally separating the polarization-multiplexed optical signal into the TE mode optical signal and the TM mode optical signal; and a control circuit for calculating the optical intensity ratio between the TE mode optical signal and the TM mode optical signal, which have had the optical signal intensity thereof adjusted by the semiconductor optical element and which have been spectrally separated by the polarization beam splitter, and for performing feedback control of the semiconductor optical element so that the calculated optical intensity ratio reaches a desired value.

6 Claims, 4 Drawing Sheets

(51) Int. Cl.
*G02F 1/015* (2006.01)
*H04B 10/67* (2013.01)
*H04J 14/06* (2006.01)
*G02B 27/28* (2006.01)
*H04J 14/02* (2006.01)

(56) References Cited

U.S. PATENT DOCUMENTS

| | | | |
|---|---|---|---|
| 7,002,733 B2* | 2/2006 | Dagenais et al. | 359/337 |
| 7,035,548 B2* | 4/2006 | Ooi et al. | 398/159 |
| 7,123,845 B2* | 10/2006 | Matsuyama | 398/208 |
| 7,158,291 B2* | 1/2007 | Saini et al. | 359/344 |
| 7,835,643 B2* | 11/2010 | Futami et al. | 398/25 |
| 8,179,592 B2* | 5/2012 | Tanaka | 359/344 |
| 8,401,405 B2* | 3/2013 | Barton et al. | 398/212 |
| 8,712,256 B2* | 4/2014 | Barton et al. | 398/212 |
| 2005/0030614 A1* | 2/2005 | Saini et al. | 359/344 |
| 2005/0117200 A1* | 6/2005 | Akiyama et al. | 359/326 |
| 2008/0240731 A1* | 10/2008 | Akiyama | 398/173 |

FOREIGN PATENT DOCUMENTS

| | | |
|---|---|---|
| JP | 6-013988 A | 1/1994 |
| JP | 2002-344426 A | 11/2002 |
| JP | 2003-106943 A | 4/2003 |
| JP | 2010-178091 A | 8/2010 |

OTHER PUBLICATIONS

Takafumi Chiba, et al., "Polarization Stabilizer Using Liquid Crystal Rotatable Waveplates", Journal of Lightwave Technology, IEEE, May 1999, pp. 885-890, vol. 17, No. 5.

Communication dated Jun. 10, 2014 from the Japanese Patent Office in counterpart Japanese application No. 2012-554852.

Gabriel Charlet, et al., "Transmission of 16.4-bit/s Capacity Over 2550 km using PDM QPSK Modulation Formal and Coherent Receiver", Journal of Lightwave Technology, Feb. 1, 2009, pp. 153-157, vol. 27, No. 3.

T. J. Xia, et al., "End-to-end Native IP Data 100G Single Carrier Real Time DSP Coherent Detection Transport over 1520-km Field Deployed Fiber", presented at the OFC' 10, OSA/OFC/NFOEC 2010, Paper PDPD4, pp. 1-3.

\* cited by examiner

POLARIZATION MULTIPLEXING OPTICAL RECEIVING DEVICE AND POLARIZATION MULTIPLEXING OPTICAL RECEIVING METHOD

CROSS REFERENCE TO RELATED APPLICATIONS

This application is a National Stage of International Application No. PCT/JP2012/051728 filed Jan. 20, 2012, claiming priority based on Japanese Patent Application No. 2011-011888, filed Jan. 24, 2011, the contents of all of which are incorporated herein by reference in their entirety.

TECHNICAL FIELD

The present invention relates to a polarization multiplexing optical receiving device for receiving a polarization multiplexing optical signal and a polarization multiplexing optical receiving method, and, more particularly, to a polarization multiplexing optical receiving device and a polarization multiplexing optical receiving method with which a mismatch of optical intensity between polarized optical signals can be compensated.

BACKGROUND ART

A polarization multiplexing technology which doubles amount of information per wave is put into practical use by putting different information, respectively on two polarized waves orthogonal to each other in an optical fiber. For example, the polarization multiplexing technology is disclosed in non-patent documents 1 and 2.

When the polarization multiplexing technology is applied, it is necessary to make each polarized wave of an optical signal the same intensity. However, because a PDL (Polarization Dependent Loss) exists in an optical component of which an optical network system is composed, an intensity mismatch is generated in response to a different loss for every polarized optical signal.

Accordingly, various technologies which reduce the optical intensity mismatch between the polarized optical signals caused by the PDL are proposed. For example, a polarization multiplexing optical receiver is disclosed in patent document 1, in which a polarization multiplexing optical signal is entered into a polarization beam splitter via a polarized wave controller for controlling a polarized state of an optical signal, and spectrally separated it into two polarization optical signals orthogonal to each other using the polarization beam splitter and outputted. The polarization multiplexing optical receiver reduces a mismatch of optical intensity between the polarized optical signals in the optical transmission path, by performing feedback control of the polarized wave controller so that the sum of the intensity of each polarized optical signal may become the maximum.

On the other hand, a polarized wave diversity receiver which compensates a difference in input distribution between the first polarized optical signal and the second polarized optical signal is disclosed in patent document 2, although it is not technology for reducing a mismatch of optical intensity between the polarized optical signals caused by PDL. A block diagram of a polarized wave diversity receiver of patent document 2 is shown in FIG. 4.

In FIG. 4, a polarized wave diversity receiver 900 performs electric conversion of the polarized wave mixed light outputted from an optical mixer 910 by using optical detector circuits 921, 922, and monitors the level of each electric current by using monitors 931, 932. Then, a polarized wave distribution difference ratio detection 940 and a distribution difference compensation circuit 950 control the gain of variable gain amplifier circuits 961, 962 using the monitored result.

The variable gain amplifier circuits 961, 962 amplify the first and second polarized wave mixed lights so that the levels of each electric current may become same, so the difference in the input distribution between the first and the second polarized wave mixed lights is compensated by a feed-forward form.

PRIOR ART DOCUMENT

Patent Document

Patent document 1: Japanese Patent Application Laid-Open No. 2010-178091
Patent document 2: Japanese Patent Application Laid-Open No. 1994-013988

Non-Patent Document

Non-patent document 1: G. Charlet et al., "Transmission of 16.4 Tbit/s Capacity over 2,550 km using PDM QPSK Modulation Format and Coherent Receiver" presented at the OFC'08 Paper PDP3.
Non-patent document 2: T. J. Xia et al., "End-to-end Native IP Data 100 G Signal Carrier Real Time DSP Coherent Detection Transport over 1520-km Field Deployed Fiber" presented at the OFC'10 Paper PDPD4.

BRIEF SUMMARY OF THE INVENTION

Problems to be Solved by the Invention

The technology of patent document 1 performs feedback control of the polarized wave controller so that the sum intensities of each spectrally separated polarized wave optical signal may become the maximum, and controls the polarized state of the optical signals. In this case, although the PDL can be eased, when the PDL at the time of inputting is large, it is difficult to improve the polarized state of the optical signals to the desired level.

On the other hand, in the technology of patent document 2, when the polarized wave mixed lights are amplified so that the levels of each electric current may become the same, because a width of the gain of this kind of amplifier is usually about 10 dB, sufficient compensation is difficult when the degree of the intensity mismatch between the polarized optical signals is large. In converting of an electric signal, it is general that the digital waveform is performed rough quantization of about 6-8 bits, and the precision of compensation thereof has a limit.

Accordingly, even if the technology of patent document 2 can be applied to the technology for compensating a difference in input distribution, it is difficult to apply it to a technology for reducing a mismatch of optical intensity between the polarized optical signals caused by the PLD for which to perform adjustment beyond 10 dB is needed.

The present invention is made in light of the above-mentioned problems, and aims at providing a polarization multiplexing optical receiving device and a polarization multiplexing optical receiving method, with which a mismatch of optical intensity between polarized optical signals accumulated in an optical transmission path of an optical receiving system can be compensated with high precision and a high-quality polarized optical signal can be received.

Means for Solving the Problems

In order to achieve the above-mentioned object, a polarization multiplexing optical receiving device according to the present invention includes: a semiconductor optical element for adjusting optical signal intensity of each of a TE mode and a TM mode of a polarization-multiplexed optical signal; a polarization beam splitter for spectrally separating the polarization-multiplexed optical signal into a TE mode optical signal and a TM mode optical signal; and a control circuit for calculating the optical intensity ratio between the TE mode optical signal and the TM mode optical signal, which have had the optical signal intensity thereof adjusted by the semiconductor optical element and which have been spectrally separated by the polarization beam splitter, and for performing feedback control of the semiconductor optical element so that the calculated optical intensity ratio reaches a desired value.

In order to achieve the above-mentioned object, a polarization multiplexing optical receiving method according to the present invention includes: adjusting optical signal intensity of each of a TE mode and a TM mode of a polarization-multiplexed optical signal using a semiconductor optical element; separating spectrally the polarization-multiplexed optical signal into a TE mode optical signal and a TM mode optical signal; calculating the optical intensity ratio between the TE mode optical signal and the TM mode optical signal, which have had the optical signal intensity thereof adjusted by the semiconductor optical element; and performing feedback control of the semiconductor optical element so that the calculated optical intensity ratio reaches a desired value.

Effect of the invention

The polarization multiplexing optical receiving device and the polarization multiplexing optical receiving method according to the present invention can compensate a mismatch of optical intensity between polarized signals accumulated in an optical transmission path of an optical receiving system with high precision, and can receive a high-quality polarized optical signal.

MODE FOR CARRYING OUT THE INVENTION (First Exemplary Embodiment)

Figure 1A:
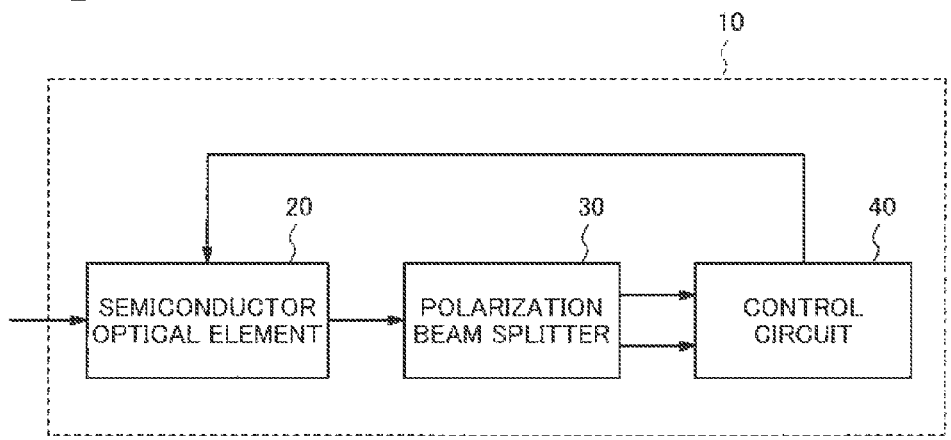
[FIG. 1A] It is a block diagram of a polarization multiplexing optical receiving device 10 according to a first exemplary embodiment of the present invention.
Figure 1B:
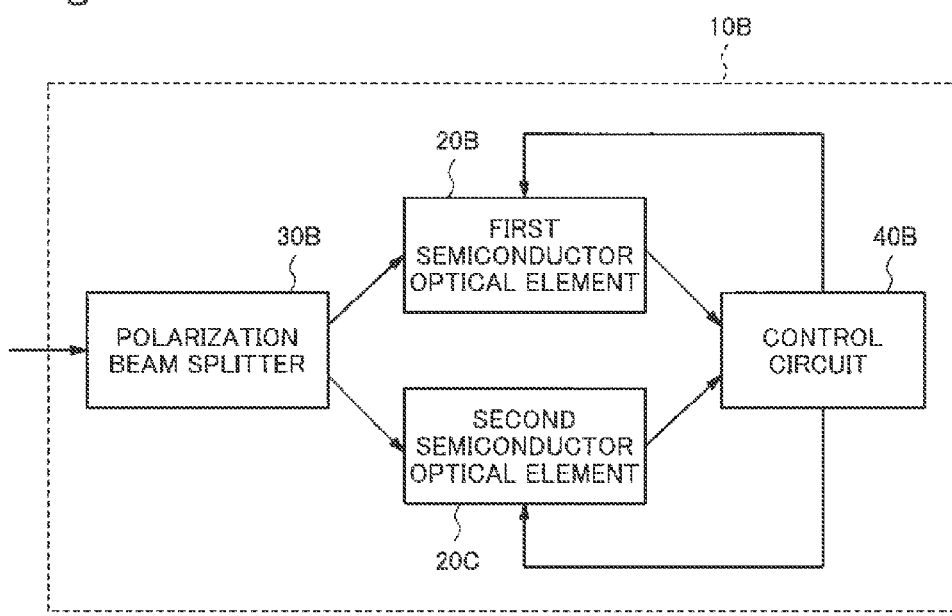
[FIG. 1B] It is a block diagram of a polarization multiplexing optical receiving device 10B according to a first exemplary embodiment of the present invention.

A first exemplary embodiment of the present invention will be described. A block diagram of a polarization multiplexing optical receiving device according to this exemplary embodiment is shown in FIG. 1. FIG. 1A is a block diagram of a polarization multiplexing optical receiving device 10 when including one semiconductor optical element, and FIG. 1B is a block diagram of a polarization multiplexing optical receiving device 10B when including two semiconductor optical elements.

In FIG. 1A, the polarization multiplexing optical receiving device 10 includes a semiconductor optical element 20, a polarization beam splitter 30 and a control circuit 40. In FIG. 1B, the polarization multiplexing optical receiving device 10B includes a first semiconductor optical element 20B, a second semiconductor optical element 20C, a polarization beam splitter 30B and a control circuit 40B.

The semiconductor optical elements 20, 20B and 20C adjust optical intensity of one of two polarized wave (hereinafter, described as TE mode and TM mode.) optical signals of a polarization-multiplexed optical signal with priority. The polarization beam splitters 30, 30B separate spectrally a polarization-multiplexed optical signal into a TE mode optical signal and a TM mode optical signal and output.

In FIG. 1A, as for the polarization-multiplexed optical signal inputted to the polarization multiplexing optical receiving device 10, the optical intensity of one mode optical signal is adjusted by the semiconductor optical element 20 with priority. The polarization-multiplexed optical signal to which the optical intensity of one mode signal was adjusted inputs to the polarization beam splitter 30, is separated spectrally into a TE mode optical signal and a TM mode optical signal and inputs to the control circuit 40.

On the other hand, in FIG. 1B, a polarization-multiplexed optical signal inputted to the polarization multiplexing optical receiving device 10B is separated spectrally by the polarization beam splitter 30B into a TE mode optical signal and a TM mode optical signal. As for the TE mode optical signal, optical intensity thereof is adjusted in the semiconductor optical element 20B, and it is inputted to the control circuit 40B. On the other hand, as for the TM mode optical signal, optical intensity thereof is adjusted in the semiconductor optical element 20C, and it is inputted to the control circuit 40B.

Two polarized wave optical signals (TE mode optical signal and TM mode optical signal) whose optical intensity was adjusted by the semiconductor optical elements 20, 20B and 20C and which were spectrally separated by the polarization beam splitters 30, 30B input to the control circuits 40, 40B.

The control circuits 40 and 40B calculate the optical intensity ratio between two inputted polarized optical signals, and perform feedback control of the semiconductor optical elements 20, 20B and 20C so that the calculated optical intensity ratio may become a desired value. In this exemplary embodiment, the control circuits 40, 40B convert two polarized optical signals to electrical signals respectively, and process them digitally.

Here, when semiconductor optical amplifiers are applied as the semiconductor optical elements 20, 20B and 20C, the control circuits 40, 40B calculate an applied current for setting the optical intensity ratio to a desired value and output it to the semiconductor optical elements 20, 20B and 20C. When the control circuits 40, 40B calculate applied current which increases a gain of TE mode and output it to the semiconductor optical elements 20, 20B, optical intensity of the TE mode optical signal increases. When the control circuits 40, 40B, on the other hand, output the applied current which increases a gain of TM mode to the semiconductor optical elements 20, 20C, optical intensity of the TM mode optical signal increases.

As mentioned above, in the polarization multiplexing optical receiving devices 10, 10B according to this exemplary embodiment, the control circuits 40, 40B calculate the optical intensity ratio between two polarized optical signals, which have had the optical signal intensity thereof adjusted by the semiconductor optical elements 20, 20B and 20C and which have been spectrally separated by the polarization beam splitters 30, 30B, and perform feedback control of the semiconductor optical elements 20, 20B and 20C based on the calculated optical intensity ratio. In this case, in a polarization-multiplexed optical signal, even when one polarized optical signal degrades remarkably, the optical intensities of two polarized optical signals are adjusted by the semiconductor optical elements 20, 20B and 20C, and a quality of the polarization-multiplexed optical signal is improved.

In the polarization multiplexing optical receiving devices 10, 10B according to this exemplary embodiment, because the semiconductor optical elements 20, 20B and 20C adjust optical intensities in the state of the polarized optical signals, they can be adjusted with high accuracy compared with a case when the intensity is adjusted in the state of the electrical signal.

Accordingly, the polarization multiplexing optical receiving devices 10 and 10B according to this exemplary embodiment can compensate with high precision a mismatch of optical intensity between polarized signals accumulated in an optical transmission path of an optical receiving system and can receive a high-quality polarized optical signal.

(Second Exemplary Embodiment)

A second exemplary embodiment will be described. As an optical amplifier inserted in an optical transmission path, there are a rare earth added fiber amplifier represented by an EDFA (erbium-doped optical fiber amplifier), a Raman amplifier, a semiconductor optical amplifier or the like. In this exemplary embodiment, as a semiconductor optical element which compensates a mismatch of optical intensity between the polarized optical signals, the semiconductor optical amplifier is applied.

When the semiconductor optical amplifier is made without devising the structure, polarization dependency will generate on it. As this cause, it is considered that optical confinement factors (Γ) are different for every orthogonal polarized signal and optical amplification factors in a quantum well used for a luminescence material of the semiconductor optical amplifier are different for every orthogonal polarized signal.

Because the polarization dependency generates a mismatch of optical intensity between polarized optical signals, an optical amplifier with small polarization dependency is generally arranged in an optical receiving system. In contrast, in this exemplary embodiment, by using the polarization dependency positively, the mismatch of optical intensity between the polarized optical signals accumulated in an optical signal is compensated.

Figure 2:
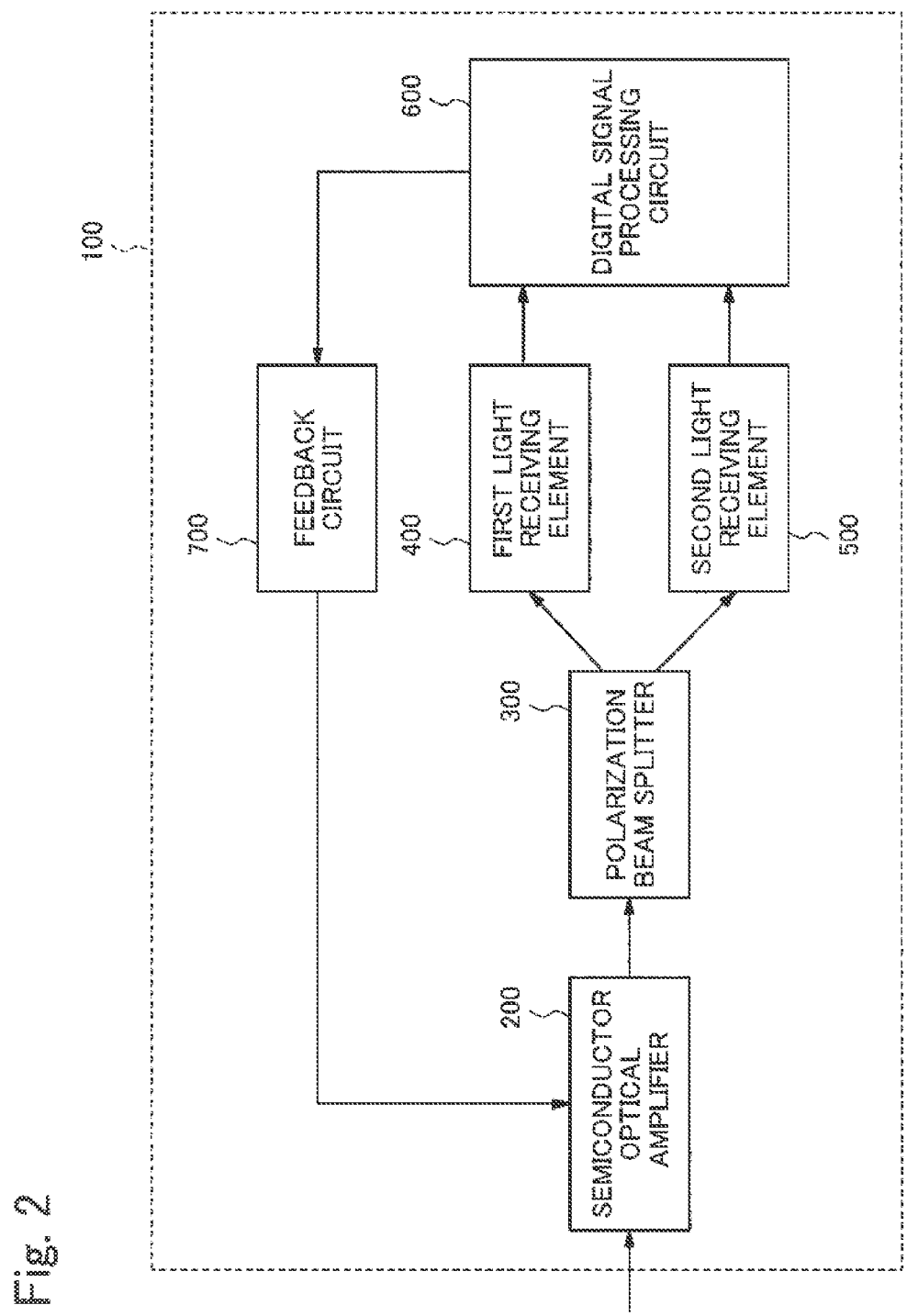
[FIG. 2] It is a block diagram of a polarization multiplexing optical receiving device 100 according to a second exemplary embodiment of the present invention.

An example of a block diagram of a polarization multiplexing optical receiving device according to this exemplary embodiment is shown in FIG. 2. In FIG. 2, a polarization multiplexing optical receiving device 100 includes a semiconductor optical amplifier 200, a polarization beam splitter 300, a first light receiving element 400, a second light receiving element 500, a digital signal processing circuit 600 and a feedback circuit 700.

The semiconductor optical amplifier 200 has polarization dependency in an optical amplification factor, and amplifies either a TE mode optical signal or a TM mode optical signal with priority. In this exemplary embodiment, the semiconductor optical amplifier 200 amplifies either a TE mode optical signal or a TM mode optical signal of a polarization-multiplexed optical signal inputted to the polarization multiplexing optical receiving device 100 with priority based on a control signal inputted from a feedback circuit 700 which is mentioned later.

Further, when a high-output signal is inputted or a gain is saturated, it is considered that a waveform of the outputted signal degrades in the semiconductor optical amplifier. However, there is almost no necessity that the polarization-multiplexed optical signal inputted to a polarization multiplexing optical receiving device takes into consideration the waveform degradation by the gain saturation because the optical intensity generally attenuates.

Figure 3:
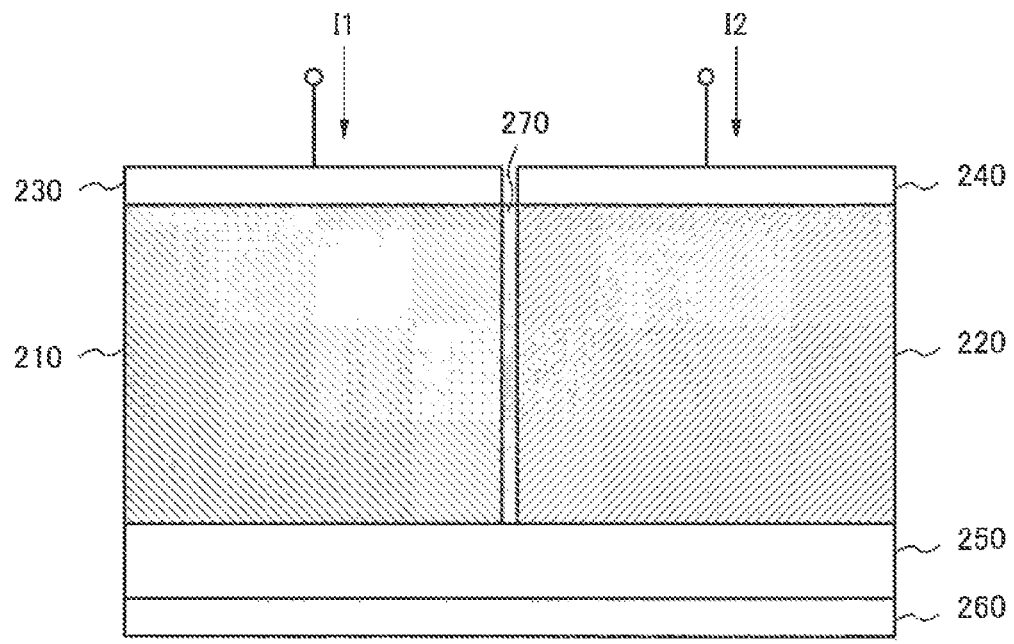
[FIG. 3] It is a block diagram of a semiconductor optical amplifier 200 according to the second exemplary embodiment of the present invention.
Figure 4:
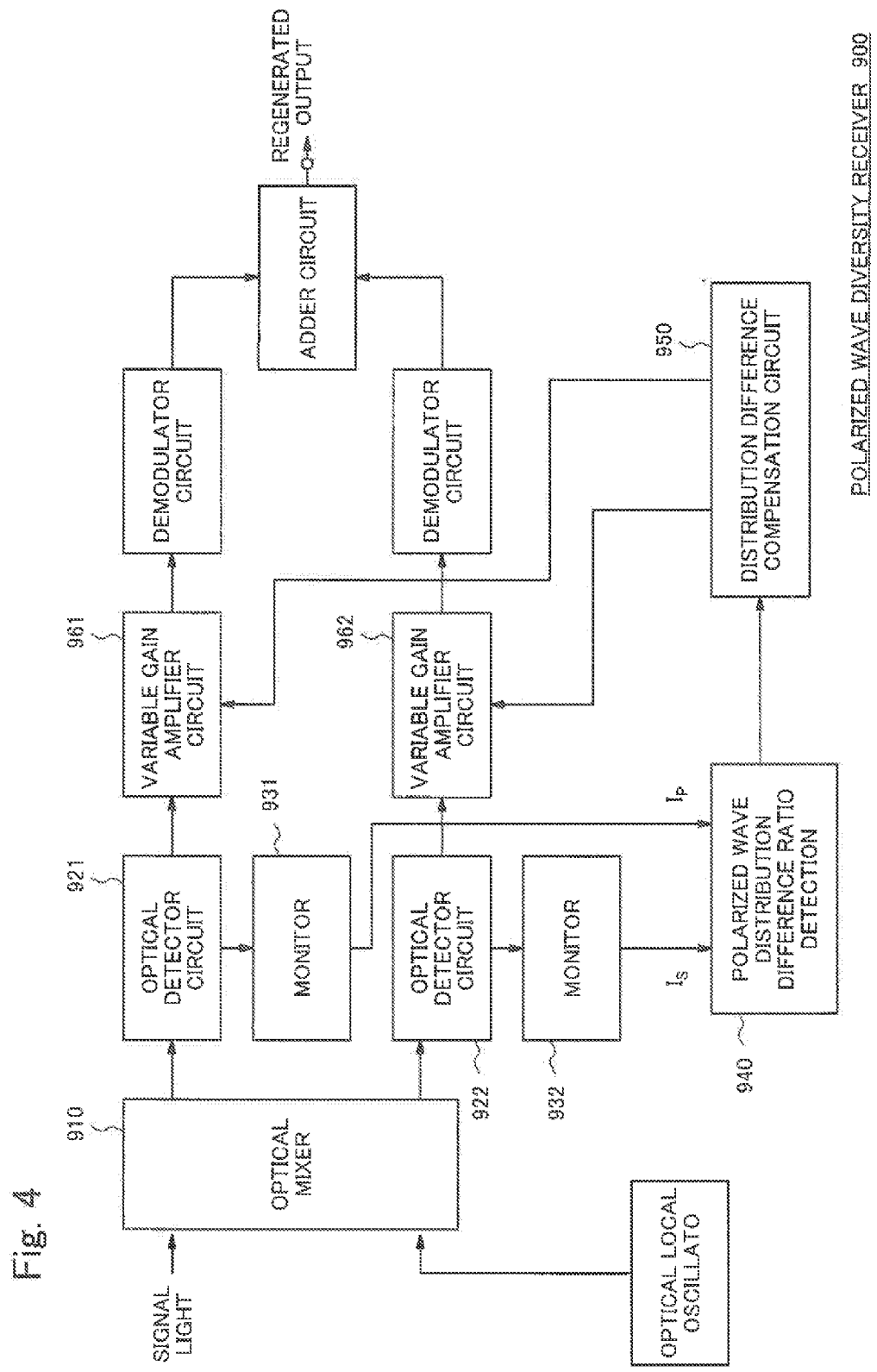
[FIG. 4] It is a block diagram of a polarized wave diversity receiver 900 of patent document 2.

The polarization dependency of the semiconductor optical amplifier 200 can be realized by an integrated technology of an optical device. An example of a structural drawing of the semiconductor optical amplifier 200 according to this exemplary embodiment is shown in FIG. 3. In FIG. 3, the semiconductor optical amplifier 200 includes a first semiconductor amplifying portion 210, a second semiconductor amplifying portion 220, a first upper electrode 230, a second upper electrode 240, a substrate 250, a lower electrode 260 and a resin layer 270.

The first semiconductor amplifying portion 210 and the second semiconductor amplifying portion 220 have mutually different TE mode gain and TM mode gain. In this exemplary embodiment, the gain of TE mode is more predominant than the gain of TM mode in the first semiconductor amplifying portion 210, and the gain of TM mode is more predominant than the gain of TE mode in the second semiconductor amplifying portion 220. The first semiconductor amplifying portion 210 and the second semiconductor amplifying portion 220 were formed by making the selective crystal growth (monolithic accumulation) of two kinds of quantum well which made the optical amplification factor to the respective polarized wave components large on the separate areas of the upper surface of the substrate 250.

The first upper electrode 230 is arranged on an upper surface of the first semiconductor amplifying portion 210 and supplies drive current I1 to the first semiconductor amplifying portion 210 based on a control signal inputted from a feedback circuit 700 mentioned later. On the other hand, the second upper electrode 240 is arranged on an upper surface of the second semiconductor amplifying portion 220 and supplies drive current I2 to the second semiconductor amplifying portion 220 based on the control signal inputted from the feedback circuit 700.

The first semiconductor amplifying portion 210 and the second semiconductor amplifying portion 220 are formed on the upper surface of the substrate 250. A lower electrode 260 which is a common electrode of the first semiconductor amplifying portion 210 and the second semiconductor amplifying portion 220 is arranged on an undersurface of the substrate 250. The first semiconductor amplifying portion 210 is arranged between the first upper electrode 230 and the lower electrode 260, and the second semiconductor amplifying portion 220 is arranged between the second upper electrode 240 and the lower electrode 260.

The resin layer 270 is arranged between the first semiconductor amplifying portion 210 and the second semiconductor amplifying portion 220, and it separates the first semiconductor amplifying portion 210 and the second semiconductor amplifying portion 220 electrically.

Further, the semiconductor optical amplifier 200 is not limited to the structure shown in FIG. 3. For example, in the semiconductor optical amplifier 200, by joining the semiconductor amplifying portions 210, 220, and separating the first upper electrode 230 and the second upper electrode 240, the semiconductor amplifying portions 210, 220 can be separated electrically.

The description of FIG. 2 is returned to. In FIG. 2, the polarization beam splitter 300 separates spectrally a polarization-multiplexed optical signal to which optical intensity between the polarized optical signals was adjusted in the semiconductor optical amplifier 200 into two polarized wave components. In this exemplary embodiment, the polarization-multiplexed optical signal inputted to the polarization beam splitter 300 is separated spectrally into optical signals of TE mode and TM mode orthogonal to each other substantially. The TE mode optical signal is outputted to the first light receiving element 400, and the TM mode optical signal is outputted to the second light receiving element 500.

The first light receiving element 400 converts the TE mode optical signal outputted from the polarization beam splitter 300 into an electrical signal and outputs to the digital signal processing circuit 600 as a first electrical signal. The second light receiving element 500 converts the TM mode optical signal outputted from the polarization beam splitter 300 into an electrical signal and outputs to the digital signal processing circuit 600 as a second electrical signal.

The digital signal processing circuit 600 removes a dispersion and noise from the first and second electrical signals outputted from the first light receiving element 400 and the second light receiving element 500 and performs a predetermined process. The digital signal processing circuit 600 calculates the intensity ratio of the first electrical signal and the second electrical signal after removing the dispersion and the noise, and outputs to the feedback circuit 700.

A feedback circuit 700 calculates drive currents I1 and I2 for adjusting the optical intensity ratio of the TE mode optical signal and the TM mode optical signal to a desired value based on the intensity ratio inputted from the digital signal processing circuit 600 and outputs to the semiconductor optical amplifier 200 as a control signal.

By outputting the control signal which increases the drive current I1 supplied to the first semiconductor amplifying portion 210 from the feedback circuit 700 supplies, the optical intensity of TE mode of the optical signal is increased. On the other hand, by outputting the control signal which increased the drive current I2 supplied to the second semiconductor amplifying portion 220 from the feedback circuit 700, the optical intensity of TM mode of the optical signal is increased.

As described above, in the polarization multiplexing optical receiving device 100 according to this exemplary embodiment, the feedback circuit 700 calculates the drive currents I1 and I2 which adjust the optical intensity ratio between the TE mode optical signal and the TM mode optical signal to the desired value based on the intensity ratio outputted from the digital signal processing circuit 600 and performs feedback control of the semiconductor optical amplifier 200 using the calculated drive currents I1 and I2. In this case, even when one polarized optical signal degrades remarkably, the degraded polarized optical signal is amplified by the semiconductor optical amplifier 200, and a quality of the polarization-multiplexed optical signal is improved. Because the semiconductor optical amplifier 200 performs compensation at the stage of the optical signal, it can perform the compensation with high accuracy compared with the compensation at the stage of the electrical signal.

Accordingly, the polarization multiplexing optical receiving device 100 according to this exemplary embodiment improves the mismatch of optical intensity between the polarized signals accumulated in the optical transmission path of the optical receiving system with high accuracy, and can receive a high-quality polarized optical signal.

Here, because only noise included in one polarized optical signal is amplified when the semiconductor optical amplifier 200 is arranged in a later stage of the polarization beam splitter 300, a load of noise processing of the digital signal processing circuit 600 becomes high. In contrast, when arranging the semiconductor optical amplifier 200 in a former stage of the polarization beam splitter 300, noise is also amplified and distributed with a desired ratio by separating spectrally, after being adjusted so that the optical intensity ratio may become the desired value. In this case, a load of noise processing by the digital signal processing circuit 600 can be reduced, and influence of noise included in the polarization-multiplexed optical signal can be reduced.

In the semiconductor optical amplifier 200, two areas having mutually different TE mode gain and TM mode gain were integrated in one device by monolithic accumulation. In this case, the occupation area of the semiconductor optical amplifier 200 can be reduced. The semiconductor optical amplifier 200 can be operated by driving two areas simultaneously as an optical amplifier of a former stage of the first light receiving element 400 and the second light receiving element 500.

Further, for example, hybrid accumulation of optical parts which amplify polarized wave components orthogonal to each other selectively can be performed instead of accumulating two areas having mutually different TE mode gain and TM mode gain in one device. Two elements which selectively amplify separate polarized wave components orthogonal to each other can be employed just as it is as the semiconductor optical amplifier 200. In this case, two semiconductor optical elements which can amplify respective different polarized wave components selectively are prepared, one of the two is rotated 90 degrees centering on a light propagation direction, and they are connected. Or, two semiconductor optical elements which increased the optical amplification factor to the respective polarized signal components can also be used by changing the structure of a quantum well.

A semiconductor optical variable attenuator can be applied instead of the semiconductor optical amplifier 200. When the semiconductor optical variable attenuator is applied, the optical intensity of polarized signal component with larger optical intensity is attenuated selectively, and a mismatch of optical intensity between two polarized optical signals orthogonal to each other is compensated by PDL.

Although the preferred exemplary embodiments of the present invention have been described above, these are only just illustration and not limit the present invention at all. Various changes can be made within the scope of the present invention.

This application insists on priority based on Japanese application Japanese Patent Application No. 2011-011888 filed on Jan. 24, 2011, the disclosure of which is incorporated herein in its entirety.

INDUSTRIAL APPLICABILITY

The polarization multiplexing optical receiving device according to the present invention can be used for a middle-and-long-distance light source for wavelength multiplexing communication used for the trunk line system and the access system.

DESCRIPTION OF SYMBOLS 10, 10B polarization multiplexing optical receiving device
20, 20B, 20C semiconductor optical element 30, 30B polarization beam splitter
40, 40B control circuit
100 polarization multiplexing optical receiving device
200 semiconductor optical amplifier
210 first semiconductor amplifying portion
220 second semiconductor amplifying portion
230 first upper electrode
240 second upper electrode
250 substrate
260 lower electrode
270 resin layer
300 polarization beam splitter
400 first light receiving element
500 second light receiving element
600 digital signal processing circuit
700 feedback circuit

The invention claimed is:

1. A polarization multiplexing optical receiving device comprising:
   a semiconductor optical element which adjusts optical signal intensity of each of a transverse electric(TE) mode and a transverse magnetic(TM) mode of a polarization-multiplexed optical signal;
   a polarization beam splitter which spectrally separates the polarization-multiplexed optical signal into the TE mode optical signal and the TM mode optical signal; and
   a control circuit which calculates the optical signal intensity ratio between the TE mode optical signal and the TM mode optical signal, which have had the optical signal intensity thereof adjusted by the semiconductor optical element and which have been spectrally separated by the polarization beam splitter, and which performs feedback control of the semiconductor optical element so that the calculated optical intensity ratio reaches a desired value, wherein the control circuit performs feedback control of the semiconductor optical element by calculating applied current for adjusting the optical intensity ratio to a desired value and outputting it to the semiconductor device, and
   wherein the semiconductor optical element is a semiconductor amplifier comprising:
   a first semiconductor amplifying portion having a gain of TE mode more dominant than a gain of TM mode;
   a second semiconductor amplifying portion having a gain of TM mode more dominant than a gain of TE mode;
   a first upper electrode which supplies a first current to the first semiconductor amplifying portion based on the applied current;
   a second upper electrode which supplies a second current to the second semiconductor amplifying portion based on the applied current; and
   a lower electrode which is a common electrode for the first semiconductor amplifying portion and the second semiconductor amplifying portion.

2. The polarization multiplexing optical receiving device according to claim 1,
   wherein the semiconductor optical element is arranged in a former stage of the polarization beam splitter.

3. The polarization multiplexing optical receiving device according to claim 1 further comprising:
   two of the semiconductor optical element;
   wherein the two semiconductor optical elements are arranged in later stages thereof respectively which were spectrally separated by the polarization beam splitter.

4. The polarization multiplexing optical receiving device according to claim 1, wherein the semiconductor optical element is a semiconductor optical variable attenuator.

5. The polarization multiplexing optical receiving device according to claim 1 further comprising:
   a first light receiving element and a second light receiving element which converts a TE mode optical signal and a TM mode optical signal, which have had the optical signal intensity thereof adjusted by the semiconductor optical element and which have been spectrally separated by the polarization beam splitter to an electrical signal respectively and outputting respective electrical signals;
   wherein the control circuit calculates the optical intensity ratio using the electrical signals outputted from the first light receiving element and the second light receiving element.

6. A polarization multiplexing optical receiving method comprising:
   adjusting intensity of optical signals of a transverse electric (TE) mode and a transverse magnetic(TM) mode of a polarization-multiplexed optical signal using a semiconductor optical element, respectively;
   separating spectrally the polarization-multiplexed optical signal into the TE mode optical signal and the TM mode optical signal;
   calculating optical intensity ratio between the TE mode optical signal and the TM mode optical signal which have had the optical signal intensity thereof adjusted by the semiconductor optical element; and
   performing feedback control of the semiconductor optical element so that the calculated optical intensity may become a desired value, wherein the control circuit performs feedback control of the semiconductor optical element by calculating applied current for adjusting the optical intensity ratio to a desired value and outputting it to the semiconductor device, and
   wherein the semiconductor optical element is a semiconductor amplifier comprising:
   a first semiconductor amplifying portion having a gain of TE mode more dominant than a gain of TM mode;
   a second semiconductor amplifying portion having a gain of TM mode more dominant than a gain of TE mode;
   a first upper electrode which supplies a first current to the first semiconductor amplifying portion based on the applied current;
   a second upper electrode which supplies a second current to the second semiconductor amplifying portion based on the applied current; and
   a lower electrode which is a common electrode for the first semiconductor amplifying portion and the second semiconductor amplifying portion.

* * * * *